(12) United States Patent
Olsson et al.

(10) Patent No.: US 7,925,172 B2
(45) Date of Patent: Apr. 12, 2011

(54) HIGH POWER, LOW DISTORTION DIRECTLY MODULATED LASER TRANSMITTER

(75) Inventors: Nils Anders Olsson, Bellvue, CO (US); Daniel Mahgerefteh, Palo Alto, CA (US)

(73) Assignee: Finisar Corporation, Sunnyvale, CA (US)

(*) Notice: Subject to any disclaimer, the term of this patent is extended or adjusted under 35 U.S.C. 154(b) by 397 days.

(21) Appl. No.: 12/184,137

(22) Filed: Jul. 31, 2008

(65) Prior Publication Data

US 2009/0080905 A1 Mar. 26, 2009

Related U.S. Application Data

(63) Continuation-in-part of application No. 10/308,522, filed on Dec. 3, 2002, now Pat. No. 7,663,762, and a continuation-in-part of application No. 11/037,718, filed on Jan. 18, 2005, now Pat. No. 7,536,113, and a continuation-in-part of application No. 11/068,032, filed on Feb. 28, 2005, now Pat. No. 7,555,225, and a continuation-in-part of application No. 11/084,630, filed on Mar. 18, 2005, now Pat. No. 7,406,266, and a continuation-in-part of application No. 11/093,461, filed on Mar. 30, 2005, now Pat. No. 7,558,488, and a continuation-in-part of application No. 11/702,436, filed on Feb. 5, 2007, now Pat. No. 7,502,532, and a continuation-in-part of application No. 11/784,411, filed on Apr. 6, 2007, now Pat. No. 7,542,683.

(60) Provisional application No. 60/963,347, filed on Aug. 3, 2007.

(51) Int. Cl.
*H04B 10/04* (2006.01)

(52) U.S. Cl. ........ 398/201; 398/185; 398/186; 398/187; 398/194

(58) Field of Classification Search .......... 398/185–187, 398/194, 201
See application file for complete search history.

(56) References Cited

U.S. PATENT DOCUMENTS 3,324,295 A 6/1967 Harris
(Continued)

FOREIGN PATENT DOCUMENTS

GB 2 107 147 4/1983
(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.
(Continued)

*Primary Examiner* — Leslie Pascal
(74) *Attorney, Agent, or Firm* — Maschoff Gilmore & Israelsen

(57) ABSTRACT

An optical transmitter is disclosed wherein a directly modulated laser outputs a frequency modulated signal through a semiconductor optical amplifier. Both the optical transmitter and semiconductor amplifier are modulated according to an output of a digital data source. An optical filter is positioned to receive an output of the semiconductor optical amplifier and has a frequency dependent transmission function effective to convert the amplified signal into a filtered signal having enhanced amplitude modulation. In some embodiments, the semiconductor optical amplifier is coupled to the digital data source by means of a compensation circuit configured to high-pass filter the output of the digital signal source. In other embodiments, the semiconductor optical amplifier is coupled to the digital data source by means of a compensation circuit configured to produce an output including a first-order time derivative of the output of the digital signal source.

20 Claims, 2 Drawing Sheets

U.S. PATENT DOCUMENTS

| | | |
|---|---|---|
| 3,999,105 A | 12/1976 | Archey et al. |
| 4,038,600 A | 7/1977 | Thomas et al. |
| 4,561,119 A | 12/1985 | Epworth |
| 4,805,235 A | 2/1989 | Henmi |
| 4,841,519 A | 6/1989 | Nishio |
| 5,293,545 A | 3/1994 | Huber |
| 5,325,378 A | 6/1994 | Zorabedian |
| 5,371,625 A | 12/1994 | Wedding et al. |
| 5,412,474 A | 5/1995 | Reasenberg et al. |
| 5,416,629 A | 5/1995 | Huber |
| 5,465,264 A | 11/1995 | Buhler et al. |
| 5,477,368 A | 12/1995 | Eskildsen et al. |
| 5,550,667 A | 8/1996 | Krimmel et al. |
| 5,592,327 A | 1/1997 | Gabl et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 | 10/2002 | Roberts et al. |
| 6,506,342 B1 | 1/2003 | Frankel |
| 6,563,623 B1 | 5/2003 | Penninckx et al. |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg et al. |
| 6,687,278 B1 | 2/2004 | Mason et al. |
| 6,748,133 B2 | 6/2004 | Liu et al. |
| 6,778,307 B2 | 8/2004 | Clark |
| 6,810,047 B2 | 10/2004 | Oh et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 7,474,858 B2 * | 1/2009 | Lee et al. ............ 398/183 |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaA1 As Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

HIGH POWER, LOW DISTORTION DIRECTLY MODULATED LASER TRANSMITTER

CROSS-REFERENCE TO RELATED APPLICATIONS

This patent application claims the benefit of pending prior U.S. Provisional Patent Application Ser. No. 60/963,347, filed Aug. 3, 2007 by Daniel Mahgerefteh et al. This application is a continuation-in-part of U.S. application Ser. No. 10/308,522 filed Dec. 3, 2002; U.S. application Ser. No. 11/037,718 filed Jan. 18, 2005; U.S. application Ser. No. 11/068,032 filed Feb. 28, 2005; U.S. application Ser. No. 11/084,630 filed Mar. 18, 2005; U.S. application Ser. No. 11/093,461 filed Mar. 30, 2005; U.S. application Ser. No. 11/702,436 filed Feb. 5, 2007; and U.S. application Ser. No. 11/784,411 filed Apr. 6, 2007. The above-identified patent applications are hereby incorporated herein by reference.

BACKGROUND OF THE INVENTION

1. The Field of the Invention

This invention relates to signal transmissions, and more particularly to the transmission of optical signals.

2. The Relevant Technology

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference between the sensitivity at the output of the transmitter and the sensitivity after propagation is called the dispersion penalty. This is typically characterized by the distance over which a dispersion penalty reaches a level of ~1 dB. A standard 10 Gb/s optical digital transmitter, such as an externally modulated source can transmit up to a distance of ~50 km in standard single mode fiber at 1550 nm before the dispersion penalty reaches the level of ~1 dB, called the dispersion limit. The dispersion limit is determined by the fundamental assumption that the digital signal is transform limited, i.e. the signal has no time varying phase across its bits and has a bit period of 100 ps, or 1/(bit rate). Another measure of the quality of a transmitter is the absolute sensitivity after fiber propagation.

Three types of optical transmitters are presently in use in fiber optic systems: (i) directly modulated lasers (DML), (ii) electroabsorption modulated lasers (EML), and (iii) externally modulated Mach Zhender (MZ) lasers. For transmission in standard single mode fiber at 10 Gb/s, and 1550 nm, it has generally been assumed that MZ modulators and EMLs can have the longest reach, typically reaching 80 km. Using a special coding scheme, referred to as phase shaped duobinary, MZ transmitters can reach 200 km. On the other hand, directly modulated lasers (DML) reach <5 km because their inherent time dependent chirp causes severe distortion of the signal after this distance.

In transmitters marketed as the Chirp Managed Laser (CML™) by Finisar Corp. of Sunnyvale Calif., a frequency modulated (FM) source is followed by an Optical Spectrum Reshaper (OSR) which uses the frequency modulation to increase the amplitude modulated signal and partially compensate for dispersion in the transmission fiber. The frequency modulated source may include a directly modulated laser (DML). The Optical OSR, sometimes referred to as a frequency discriminator, can be formed by an appropriate optical element that has a wavelength-dependent transmission function. The OSR can be adapted to convert frequency modulation to amplitude modulation.

Inasmuch as frequency modulation in the output of the laser in such transmitters is converted to amplitude modulation, it is advantageous to use a laser having fast frequency response and high FM efficiency. In some instances, lasers satisfying these criteria have diminished output power. Accordingly, it would be an advancement in the art to provide an optical transmitter including a directly modulated laser and OSR that also provides high output power.

BRIEF SUMMARY OF THE INVENTION

In one aspect of the invention, an optical transmitter includes a directly modulated laser electrically coupled to a digital data source and configured to output a frequency modulated signal encoding an output of the digital data source. A semiconductor optical amplifier is positioned to receive an output of the directly modulated laser and is configured to output an amplified signal. The semiconductor optical amplifier is electrically coupled to the digital data source and a bias current source. An optical filter is positioned to receive the amplified signal and having a frequency dependent transmission function effective to convert the amplified signal into a filtered signal having enhanced amplitude modulation relative to the amplified signal.

In another aspect of the invention, the semiconductor optical amplifier is coupled to the digital data source by means of a compensation circuit configured to high-pass filter the output of the digital signal source. In other embodiments, the semiconductor optical amplifier is coupled to the digital data source by means of a compensation circuit configured to produce an output including a first-order time derivative of the output of the digital signal source.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
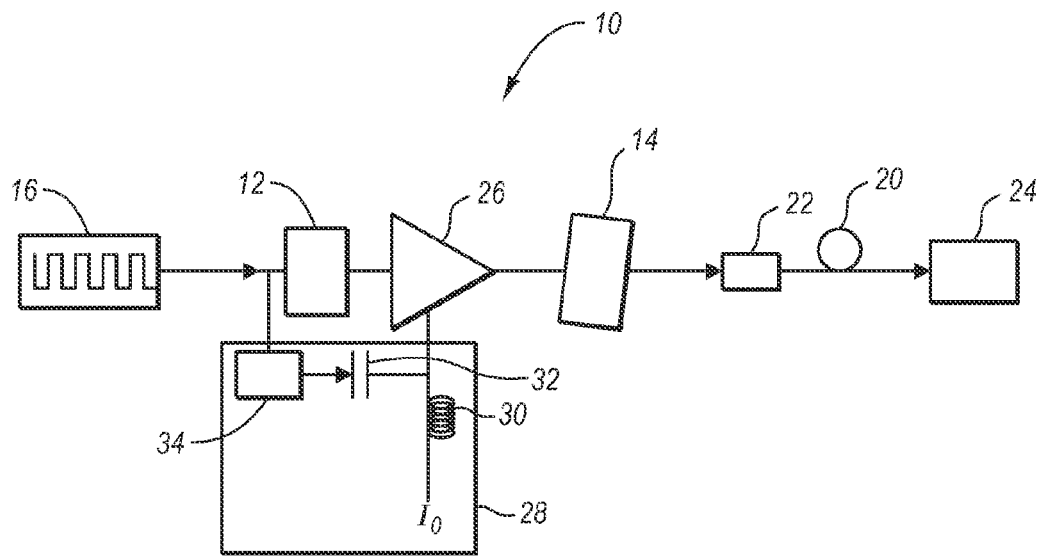
FIG. 1 illustrates an optical transmitter incorporating a compensated semiconductor optical amplifier in accordance with an embodiment of the present invention.

Referring to FIG. 1, a laser transmitter 10 includes a directly modulated laser 12, such as a distributed feedback (DFB), distributed Bragg reflector (DBR), sampled grating DBR, or Y-branch DBR laser. The output of the laser 12 is passed through an optical spectrum reshaper (OSR) 14. The laser 12 is coupled to a digital data source 16 and outputs a frequency modulated output having frequency modulation encoding data output by the data source 16. In a preferred embodiment, the frequency modulation of the laser 12 has a small amplitude modulation depth because frequency modulation is the primary modulation scheme. A small amplitude modulation 1-3 dB depth is sufficient for typical lasers to generate sufficient frequency modulation. The output of the OSR 14 is coupled to an output fiber 20 by means of coupling optics 22 and transmitted to an optical receiver 24.

The output power of the transmitter 10 is determined by the output power of the laser less the loss through the OSR 14 as well as coupling losses to an output fiber 20, such as by means of coupling optics 22. In some instances losses may total 7 to 8 dB. A typical high speed DFB laser can output 10 to 12 dBm under typical operating conditions, which leads to a minimum output power of about 4 dBm, which is acceptable for most applications. Other lasers, such as DBR lasers, for example, may have lower output power, especially if they are designed for high speed, rather than high power.

Accordingly, there are many instances in which it is desirable to boost the output power of the laser 12 using a semiconductor optical amplifier (SOA) 26 after the laser 12. The SOA 26 may be positioned before or after the OSR 14. The SOA 26 may also function as a variable optical attenuator.

Figure 2:
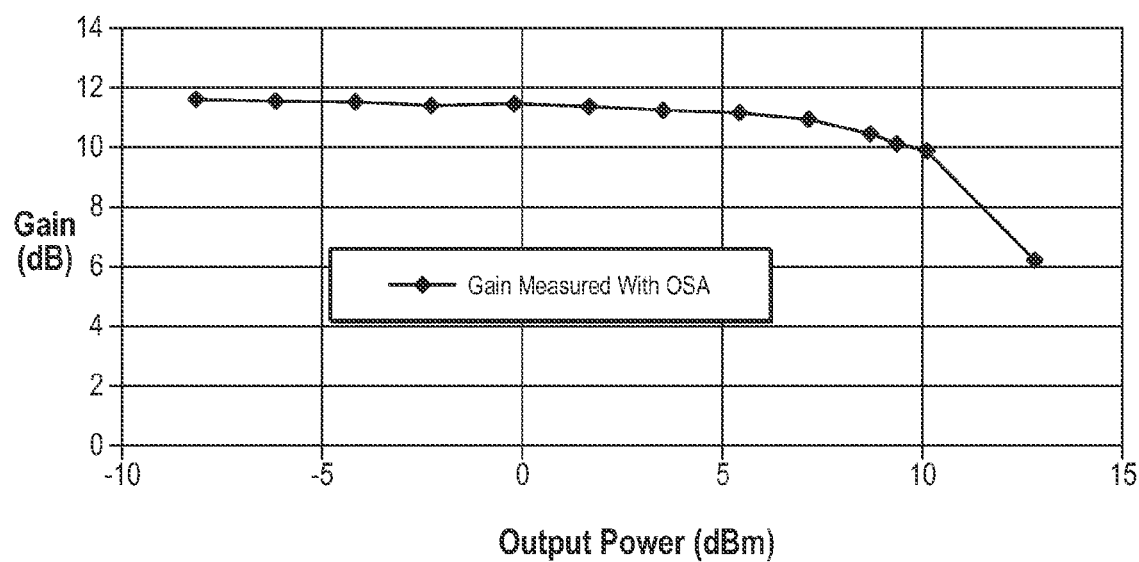
FIG. 2 illustrates a gain versus output power curve for a semiconductor optical amplifier suitable for use in accordance with an embodiment of the present invention.

An SOA used according to conventional methods tends to distort input signals. Accordingly, a compensation signal is input to the SOA 26 in some embodiments of the invention. A typical SOA has a characteristic gain versus output power curve shown in FIG. 2. The gain is nearly fixed at the so-called small signal gain level for small output power levels but decreases as output power is increased. Concurrently, the output power of the SOA saturates as the input power is increased. The point of operation where the gain is reduced by 3 dB relative to the small signal gain is called the 3 dB compression point and it is said that the SOA is in saturation at this point.

The saturation point is usually a desirable operating point since it fixes the output power for a range of input power values. However, when a modulated signal is used as input, the SOA causes distortion of the output amplitude and dynamic chirp when it is in saturation. The SOA dynamics are described by a rate equation given in an article by G. Agrawal and Anders Olsson published in IEEE J. Quantum Electronics vol. 25, No. 11, 2297 (1989), entitled "Self phase modulation and spectral broadening of optical pulses in semiconductor optical amplifiers," [Ref 1], which is slightly rearranged here to be:

$$\frac{dN(t)}{dt} + \frac{N(t)}{\tau} = \frac{I_0}{eV} - g(N)P(t)/h\nu \quad (1)$$

Here N is the carrier density, $I_0$ is the bias current to the SOA, $\tau$ is the carrier lifetime, g(N) is the carrier density dependent gain, P is the light density, e is the electric charge, V is the active volume, and hν is the photon energy.

Since gain is approximately a linear function of carrier density for small changes in carrier density, Equation 1 describes gain dynamics for carrier density. The carrier density is determined by the balance between two source terms on the right hand side of Equation 1: the rate of carrier injection by external bias current to the SOA, which tends to increase carrier density, and stimulated emission, which is induced by the incident photon density and tends to reduce carrier density. The balance of these two forces is mediated by the nonradiative recombination of the carriers at the rate given by carrier lifetime. The effect on the time dependent optical output power and chirp of an input signal is given by Equations 2.16 to 2.17 in Reference 1:

$$\frac{dP}{dz} = (g - \alpha_{int})P \quad (2)$$

$$\frac{d\phi}{dz} = -\frac{1}{2}\alpha g \quad (3)$$

Here $\alpha_{int}$ is internal loss of the SOA, $\phi$ is the phase of the optical electric field, and $\alpha$ is the linewidth enhancement factor. Chirp is given by the time derivative of phase:

$$\nu(t) = -\frac{1}{2\pi}\frac{d\phi}{dt} \quad (4)$$

If the equilibrium carrier density given in the case of no optical input; i.e. P~0, is changed for high gain or large input power as described in the prior art (e.g. Ref 1), this can lead to severe distortion of the optical amplitude and chirp.

In the present invention a method and apparatus is described that allows a high power laser transmitter 10 to use a saturated SOA 26 with reduced distortion. As shown in FIG. 1, the transmitter 10 includes the directly modulated laser 12 that outputs a frequency modulated signal encoding data from the digital signal source 16. The frequency modulated signal may also include amplitude modulation. The SOA 26 receives the frequency modulated signal and outputs an amplified version of the frequency modulated signal. The amplified signal is input to the OSR 14, which converts a portion of the frequency modulation in the amplified signal into amplitude modulation. The OSR 14 outputs a filtered signal having increased amplitude modulation. The filtered output is input to coupling optics 24 that couple the filtered signal to an optical fiber 20 for transmitting the filtered signal to an optical receiver 24.

The digital data source 16 is coupled to both the laser 12 and the SOA 26 and synchronously modulates the laser 12 and the SOA 26 with high speed data. In the illustrated embodiment, the digital data source 16 is coupled to the SOA 26 by means of a compensation circuit 28. In the embodiment of FIG. 1, the compensation circuit 28 includes a bias current source 10 coupled to a bias input of the SOA 26 by means of an inductor 30. The compensation circuit 28 further includes a capacitor 32 coupling the digital data source 16 to the bias input of the SOA 26 downstream from the inductor 30.

To understand how the compensation circuit 28 reduces distortions, consider a digital pattern used to drive the laser 12. The output power of the laser 12 increases as the 1 bit increases the current injected to the laser. The increased photon density incident on the SOA 26 decreases its carrier density by stimulated emission. However, this carrier depletion is partially compensated by the compensating signal coupled to the SOA 26, which increases the bias input for the 1 bit.

The amplitude of the compensating signal may be adjusted to minimize the distortions by the SOA 26. When the 0 bit arrives, the output of the laser 12 is reduced since less current is supplied to the laser 12. This in turn reduces the output intensity of the laser 12 and the input intensity to the SOA 26. The resulting gain recovery is reduced by the lower injection current from the compensation circuit 28 to the SOA 26, which tends to minimize the change in carrier density fluctuations. The compensation scheme can also be understood by considering how the added compensation bias to the SOA 26 affects Equation 1. In this case the bias current is modulated with the same time dependent pattern as the input photon density. The rate equation for carrier density now becomes:

$$\frac{dN(t)}{dt} + \frac{N(t)}{\tau} = \frac{I_0}{eV} + \frac{\gamma I(t)}{eV} - g(N)P(t)/h\nu \qquad (5)$$

Here I(t) is the added modulated current to the SOA, and γ is the amplitude of the correction signal to the SOA. Note that near the input of the SOA the optical power approximately follows the input modulation signal, P(t)≈kI(t), so the compensation bias tends to cancel the gain depletion, which is the last term in Equation 5.

The compensation is by no means complete. First, the gain depletion is caused by stimulated emission and is carrier density dependent. Hence this is a nonlinear term, whereas the compensation bias is independent of carrier density. Still the compensation bias to the SOA 26 will tend to reduce the carrier density fluctuations particularly in the longer nanosecond time constants.

Many variations of the present invention are envisioned. For example, the compensation circuit 28 may modify the shape of the pulses used to compensate the SOA 26. For example, the compensation circuit 28 may include a high pass circuit 34, which enhances the edges of the electrical pulses driving the SOA. This helps compensate for the fast gain depletion of the gain by stimulated emission at the transitions of 1 and 0 bits.

It is also anticipated that the laser 12 can be integrated with the SOA 26 on the same chip, allowing for a compact device. Electrical connections driving the laser 12 and SOA 26 may also be handled more easily when the laser and SOA chips are integrated and therefore in close proximity.

Figure 3:
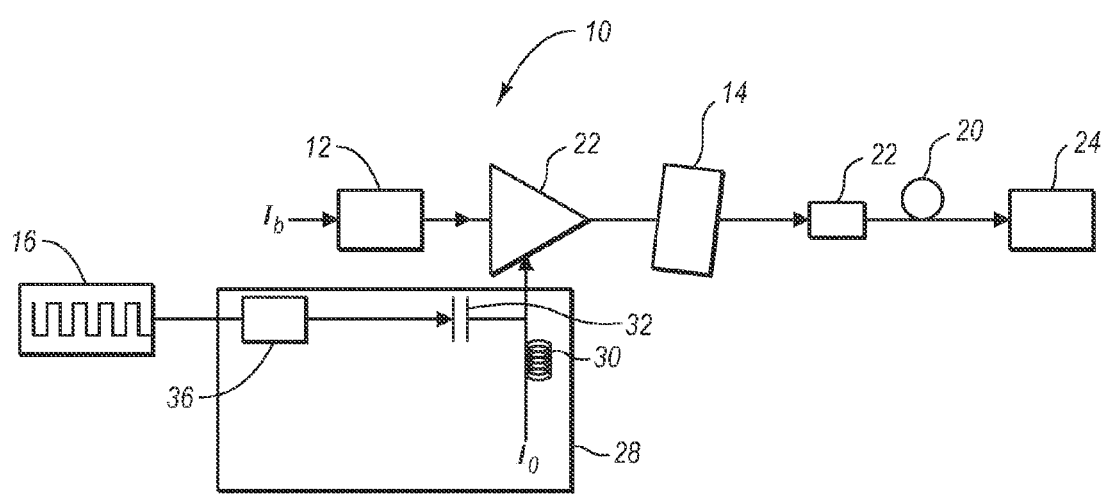
FIG. 3 illustrates an alternative embodiment of an optical transmitter incorporating a compensated semiconductor optical amplifier in accordance with an embodiment of the present invention.

Referring to FIG. 3, in another embodiment of the present invention the SOA 26 alone is used as a directly frequency modulated source. The laser 12 instead outputs a continuous wave corresponding to a substantially DC bias current $I_b$. The output of the digital data source enters a compensation circuit 28 including a pre-distortion high speed electrical circuit 36 that compensates for the long nanosecond lifetime of the SOA. The driving bias signal changes the carrier density in the SOA, which in turn changes the refractive index and creates chirp in the output signal.

The response time of the SOA 26 may be limited by carrier lifetime. However, its response may be modeled as a low pass filter. By electrically high-pass filtering the input electrical signal from the data signal source 16, the SOA 26 may be modulated to convert the continuous wave output of the laser 12 to a frequency modulated output, even at a bit rate of 10 Gb/s. The output of the SOA 26 may also include amplitude modulation. In some embodiments, the pre-distortion circuit 36 outputs a sum of the output of the digital data source 16 and the first order time derivative of the output of the digital data source 16, which is then input to the SOA 26.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter comprising:
   a digital data source;
   a directly modulated laser electrically coupled to the digital data source and configured to output a frequency modulated signal encoding an output of the digital data source;
   a semiconductor optical amplifier positioned to receive an output of the directly modulated laser and configured to output an amplified signal, the semiconductor optical amplifier being electrically coupled to the digital data source and a bias current source; and
   an optical filter positioned to receive the amplified signal and having a frequency dependent transmission function effective to convert the amplified signal into a filtered signal having enhanced amplitude modulation relative to the amplified signal.

2. The optical transmitter of claim 1, wherein the semiconductor optical amplifier is coupled to the digital data source by means of a compensation circuit configured to high-pass filter the output of the digital data source.

3. The optical transmitter of claim 1, wherein the semiconductor optical amplifier is coupled to the digital data source by means of a compensation circuit configured to produce an output including a first-order time derivative of the output of the digital data source.

4. The optical transmitter of claim 3, wherein the bias current source is coupled to the semiconductor optical amplifier by means of an inductor.

5. The optical transmitter of claim 1, wherein the digital data source is coupled to the semiconductor optical amplifier by means of a capacitor.

6. The optical transmitter of claim 3, wherein the bias current source is coupled to the semiconductor optical amplifier by means of an inductor.

7. The optical transmitter of claim 1, wherein the directly modulated laser is a distributed feedback laser.

8. The optical transmitter of claim 1, wherein the directly modulated laser is a distributed Bragg reflector laser.

9. The optical transmitter of claim 1, wherein the directly modulated laser is a Y-branch distributed Bragg reflector laser.

10. The optical transmitter of claim 1, wherein the laser is at least one of a distributed feedback laser, a distributed Bragg reflector laser, and a Y-branch distributed Bragg reflector laser.

11. A method for transmitting optical signals comprising:
    modulating a directly modulated laser according to a digital data signal to generate a frequency modulated signal encoding the digital data signal;
    transmitting the frequency modulated signal through a semiconductor optical amplifier to generate an amplified signal; and
    modulating the semiconductor optical amplifier with a compensating signal derived from the digital data signal.

12. The method of claim 11, further comprising transmitting the amplified signal through an optical spectrum reshaper to generate a filtered signal, wherein the optical spectrum reshaper has a frequency dependent transmission function effective to convert the amplified signal into a filtered signal having enhanced amplitude modulation relative to the amplified signal.

13. The method of claim 11, wherein modulating the semiconductor optical amplifier with the compensating signal derived from the digital data signal comprises modulating the semiconductor optical amplifier with a high-pass filtered version of the digital data signal.

14. The method of claim 11, wherein modulating the semiconductor optical amplifier with the compensating signal derived from the digital data signal comprises modulating the semiconductor optical amplifier with a first-order time derivative of the digital data signal.

15. The method of claim 11, wherein modulating the semiconductor optical amplifier with the compensating signal derived from the digital data signal comprises coupling a digital data source to the semiconductor optical amplifier by means of a capacitor.

16. An optical transmitter comprising:
a digital data source;
a laser configured to output a first signal;
a semiconductor optical amplifier positioned to receive the first signal and configured to output a second signal, the semiconductor optical amplifier being electrically coupled to the digital data source and a bias current source; and
an optical spectrum reshaper optically coupled to the laser and having a transmission function effective to convert the second signal into a third signal having enhanced amplitude modulation relative to the second signal.

17. The optical transmitter of claim 16, wherein the digital data source is coupled to the laser and wherein the first signal is a frequency modulated signal encoding an output of the digital data source.

18. The optical transmitter of claim 16, wherein the semiconductor optical amplifier is coupled to the digital data source by means of a compensation circuit configured to high-pass filter an output of the digital data source.

19. The optical transmitter of claim 16, wherein the semiconductor optical amplifier is coupled to the digital data source by means of a compensation circuit configured to output a first-order time derivative of an output of the digital data source.

20. The optical transmitter of claim 16, wherein the digital data source is coupled to the semiconductor optical amplifier by means of a capacitor.

* * * * *